(12) United States Patent
Watanabe et al.

(10) Patent No.: US 7,177,252 B2
(45) Date of Patent: Feb. 13, 2007

(54) METHOD AND APPARATUS FOR RECORDING DATA ON AN OPTICAL DISC

(75) Inventors: Tomofumi Watanabe, Gifu-ken (JP); Koji Hayashi, Hashima (JP); Hideto Uchida, Katano (JP); Yuichiro Tsukamizu, Ichinomiya (JP); Tomonori Kamiya, Bisai (JP)

(73) Assignee: Sanyo Electric Co., Ltd., Osaka (JP)

( * ) Notice: Subject to any disclaimer, the term of this patent is extended or adjusted under 35 U.S.C. 154(b) by 544 days.

(21) Appl. No.: 10/027,257

(22) Filed: Dec. 20, 2001

(65) Prior Publication Data

US 2002/0105873 A1 Aug. 8, 2002

(30) Foreign Application Priority Data

Dec. 22, 2000 (JP) ............................. 2000-390652

(51) Int. Cl.
G11B 15/52 (2006.01)
(52) U.S. Cl. ................................ 369/47.51; 369/53.27
(58) Field of Classification Search ............ 369/47.49, 369/47.5, 47.51, 47.52, 47.53, 47.54, 53.26, 369/53.27, 53.29, 53.34, 59.12, 124.07
See application file for complete search history.

(56) References Cited

U.S. PATENT DOCUMENTS

| | | | | |
|---|---|---|---|---|
| 4,984,227 A * | 1/1991 | Yoshimaru | ............... | 369/47.41 |
| 5,182,741 A * | 1/1993 | Maeda et al. | ............ | 369/47.48 |
| 5,315,402 A * | 5/1994 | Ito et al. | ..................... | 386/126 |
| 5,502,702 A | 3/1996 | Nakajo | | |
| 5,848,043 A * | 12/1998 | Takada et al. | ............. | 369/53.3 |
| 6,442,115 B1 * | 8/2002 | Shimoda et al. | ......... | 369/47.28 |
| 6,459,666 B1 | 10/2002 | Yokoi | | |
| 6,504,806 B1 * | 1/2003 | Nakajo | .................... | 369/59.12 |
| 6,781,937 B2 * | 8/2004 | Nakajo | .................... | 369/59.12 |
| 2001/0043527 A1 | 11/2001 | Yoshida | | |

FOREIGN PATENT DOCUMENTS

| | | |
|---|---|---|
| JP | 08-249662 | 9/1996 |
| JP | 10-083535 | 3/1998 |
| JP | 10-106008 | 4/1998 |
| JP | 2000-173089 | 6/2000 |
| JP | 2001-067674 | 3/2001 |

* cited by examiner

*Primary Examiner*—Paul W. Huber
(74) *Attorney, Agent, or Firm*—Fish & Richardson P.C.

(57) ABSTRACT

A data recording device for recording data on an optical disc by irradiating a laser pulse on the optical disc while controlling rotation of the optical disc at a constant angular velocity. The device includes a laser condition varying unit that changes a peak value of the laser pulse in accordance with a value relating to a linear velocity of the optical disc at a position at which the laser pulse is irradiated.

21 Claims, 5 Drawing Sheets

METHOD AND APPARATUS FOR RECORDING DATA ON AN OPTICAL DISC

BACKGROUND OF THE INVENTION

The present invention relates to a data recording device and a data recording control device. More specifically, the present invention relates to a data recording device and data recording control device that record data while rotating an optical disc at a constant angular velocity.

A compact disc-recordable (CD-R) is known as an optical disc capable of recording data. CD-Rs record data once, for example, in disc units or track units and are superior in their cost efficiency per unit of data.

A pregroove, which is a guide groove, is formed in a spiral configuration in a CD-R. Information such as the position on the disc (i.e., the absolute time) and the respective maker's specifications is written in the pregroove. The pregroove wobbles in accordance with the information in a predetermined manner. When data is recorded in a guide groove, an absolute time in pregroove (ATIP) address that shows the absolute time information on the optical disc is read from the pregroove. Data is then recorded while accurately ascertaining the data recording position on the disc using the ATIP address.

A recording device that records data on a CD-R normally includes:

a recording laser drive circuit for irradiating a laser pulse on an optical disc in accordance with the data being recorded;

a read laser drive circuit for irradiating a laser pulse used to reproduce data on an optical disc and reading an ATIP address in order to find the absolute time in the optical disc; and a decoder for reading an ATIP address by decoding reflected laser pulse.

Further, in order to irradiate a laser pulse along a pregroove, a recording device is provided with an optical head that adjusts the position of the laser pulse irradiation on the optical disc from the laser drive circuit in the radial direction, and a spindle motor that rotates the optical disc. The recording device irradiates a laser pulse along a pregroove by rotating the optical disc with the spindle motor to move the laser pulse irradiation position in the circumferential direction and by moving the laser pulse irradiation position in the radial direction using the optical head.

Conventionally, the rotation of an optical disc is controlled using the constant linear velocity (CLV) technique. In the CLV technique, the rotation of the optical disc is controlled such that the advancing distance per unit time of the laser pulse irradiated on the optical disc is kept constant. As a result, when data is being recorded, regardless of the recording position on the optical disc, there is no alteration in the write strategy of the intensity, the pulse width and the pulse timing of the laser pulse irradiated on the disc.

However, in order to control the constant linear velocity of an optical disc, the rotating speed of the disc must be slower as the laser pulse irradiation position becomes closer to the radially outer side of the disc. Therefore, the speed of the spindle motor must be altered depending on the position of the laser pulse irradiation on the optical disc. This results in the control of the spindle motor becoming complicated. In particular, if the recording device is installed in a portable computer and driven by a battery, the complicated control of the spindle motor increases the battery power consumption.

Accordingly, the application of a constant angular velocity (CAV) technique to control the rotation of an optical disc is also desired. In this case, however, it becomes difficult to control the recording system of the recording device.

Moreover, recording devices that record data on an optical disc, such as a compact disc-rewritable (CD-RW), or a magneto-optical disc, such as a magneto-optic (MO) disc or a mini disc (MD), also have the same problem. In the specification, unless otherwise stated, the term "optical disc" is understood to include magneto-optical discs.

SUMMARY OF THE INVENTION

It is an object of the present invention to provide a data recording device and a data recording control device capable of performing a recording operation while controlling the rotation of an optical disc using the constant angular velocity technique.

To achieve the above object, the present invention provides a data recording device for recording data on an optical disc by irradiating a laser pulse on the optical disc while controlling rotation of the optical disc at a constant angular velocity. The device includes a laser condition varying unit that changes a peak value of the laser pulse in accordance with a value relating to a linear velocity of the optical disc at a position at which the laser pulse is irradiated.

A further perspective of the present invention is a data recording device for recording data on an optical disc by irradiating a laser pulse on the optical disc while controlling rotation of the optical disc at a constant angular velocity. The device includes a laser condition varying unit for generating a clock using a value relating to a linear velocity of the optical disc at a position at which the laser pulse is irradiated and for altering at least one of a pulse timing and a pulse width of the laser pulse based on the clock.

A further perspective of the present invention is a data recording device for recording data on an optical disc by irradiating a laser pulse on the optical disc while controlling rotation of the optical disc at a constant angular velocity. The device includes a laser condition varying unit for altering a peak value of the laser pulse using a value relating to a linear velocity of the optical disc at a position at which the laser pulse is irradiated. The laser condition varying unit generates a clock using a value relating to a linear velocity of the optical disc at a position at which the laser pulse is irradiated and alters at least one of a pulse timing and a pulse width of the laser pulse based on the clock.

A further perspective of the present invention is a data recording device for recording data on an optical disc by irradiating a laser pulse on the optical disc while controlling rotation of the optical disc at a constant angular velocity. The device includes a storage device for storing a specifying value specifying at least one of a pulse timing and a pulse width of the laser pulse. The specifying value is set in accordance with a linear velocity of the optical disc at a position at which the laser pulse is irradiated. A control unit reads the specifying value stored in the storage device and sequence controls at least one of the pulse timing and the pulse width of the laser pulse based on the read specifying value.

A further perspective of the present invention is a data recording control device for controlling recording of data on an optical disc while controlling rotation of the optical disc at a constant angular velocity. The date is recorded by irradiating a laser pulse on the optical disc. A spiral pregroove for recording disc information is formed on the optical disc. The device includes a detection circuit for reproducing the disc information of the pregroove and detecting a value relating to a linear velocity of the optical disc at a position at which the laser pulse is irradiated in accordance with the reproduced disc information. A strategy specifying circuit is connected to the detection circuit for specifying a peak value of the laser pulse in accordance with the detected value. A laser drive circuit is connected to the strategy specifying circuit for altering the peak value of the laser pulse to the specified peak value.

A further perspective of the present invention is a data recording control device for controlling recording of data on an optical disc while controlling rotation of the optical disc at a constant angular velocity. The date is recorded by irradiating a laser pulse on the optical disc. A spiral pregroove for recording disc information is formed on the optical disc. The device includes a detection circuit for reproducing the disc information of the pregroove and detecting a value relating to a linear velocity of the optical disc at a position at which the laser pulse is irradiated in accordance with the reproduced disc information. A clock generating circuit is connected to the detection circuit for generating a clock using a value relating to the linear velocity of the optical disc at the position at which the laser pulse is irradiated in accordance with the detected value. A strategy specifying circuit is connected to the detection circuit for specifying at least one of a pulse width and a pulse timing of the laser pulse in accordance with the detected value. A laser drive circuit is connected to the strategy specifying circuit for altering the at least one of the pulse width and the pulse timing of the laser pulse to the specified at least one of the pulse timing and the pulse width of the laser pulse based on the clock.

A further perspective of the present invention is a data recording control device for controlling recording of data on an optical disc while controlling rotation of the optical disc at a constant angular velocity. The date is recorded by irradiating a laser pulse on the optical disc. A spiral pregroove for recording disc information is formed on the optical disc. The device includes a detection circuit for reproducing the disc information of the pregroove and detecting a value relating to a linear velocity of the optical disc at a position at which the laser pulse is irradiated in accordance with the reproduced disc information. A clock generating circuit is connected to the detection circuit for generating a clock using a value relating to the linear velocity of the optical disc at the position at which the laser pulse is irradiated in accordance with the detected value. A strategy specifying circuit is connected to the detection circuit for specifying a peak value of the laser pulse and at least one of a pulse width and a pulse timing of the laser pulse in accordance with the detected value. A laser drive circuit is connected to the strategy specifying circuit for altering the peak value of the laser pulse based on the specified peak value. The laser drive circuit alters the at least one of the pulse width and the pulse timing of the laser pulse to the specified at least one of the pulse timing and the pulse width of the laser pulse based on the clock.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
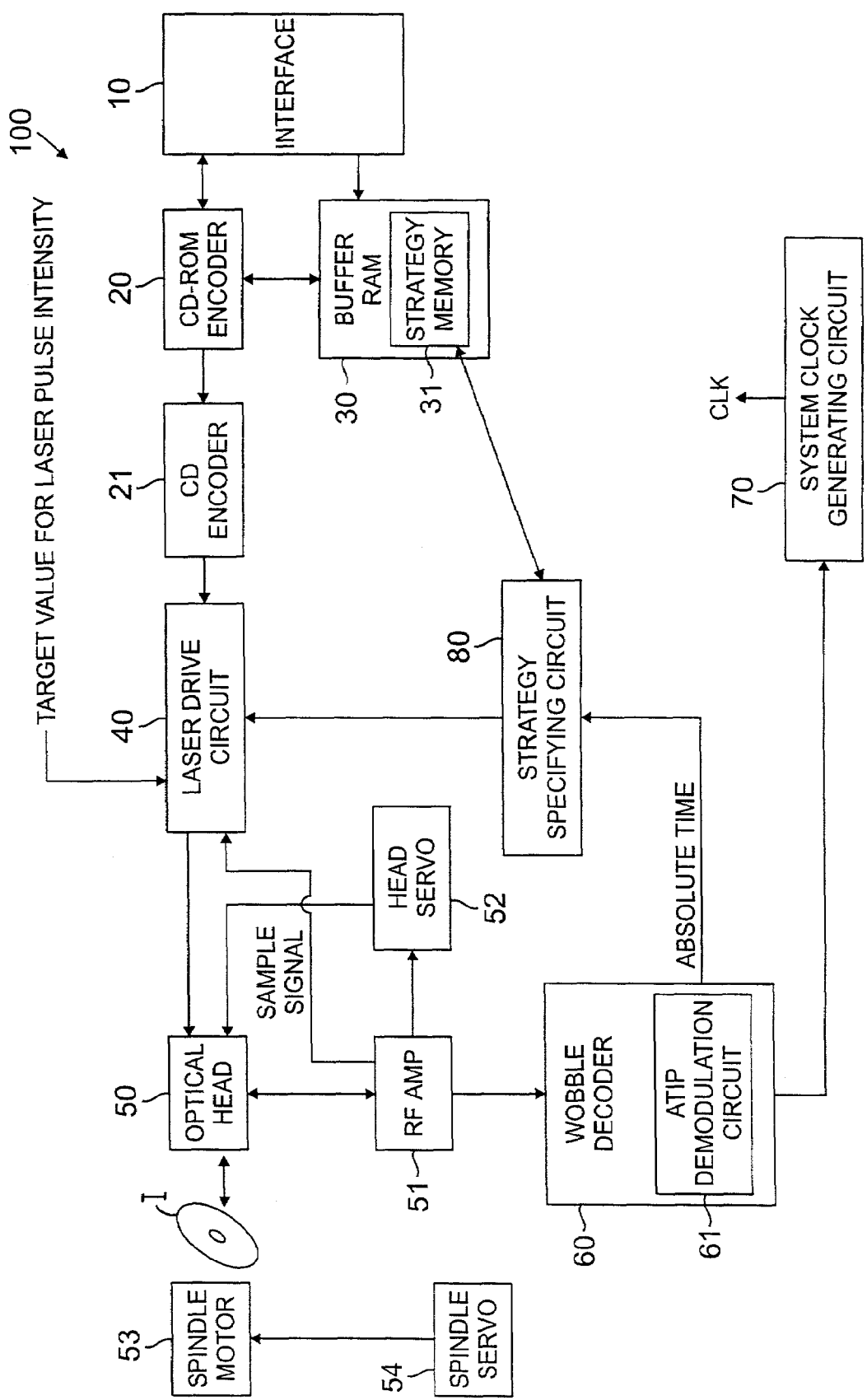
FIG. 1 is a schematic block diagram of a data recording device according to a preferred embodiment of the present invention.

In the drawings, like numerals are used for like elements throughout.

FIG. 1 is a block diagram showing the overall structure of a data recording device 100 and a data recording control device provided in the data recording device 100 according to a preferred embodiment of the present invention. The data recording device 100 is used in a recording device for a CD-R (i.e., optical disc) 1.

A spiral pregroove (guide groove) is formed in the optical disc 1. The pregroove is formed wobbling on the optical disc in correspondence with information relating to absolute time (ATIP) and the disc specification that is written in the pregroove. When data is recorded on the optical disc 1, the absolute time information is extracted to record the desired data at a predetermined position in the pregroove.

The data recording device 100 will now be described.

The data recording device 100 includes a CD-ROM encoder 20, a buffer RAM 30, a CD encoder 21, a laser drive circuit 40 for generating a drive signal corresponding to encoded data, and an optical head 50 for irradiating laser pulse on the optical disc 1 in accordance with the drive signal.

The CD-ROM encoder 20 temporarily transfers data provided from an interface 10 to the buffer RAM 30. The CD-ROM encoder 20 then reads data in predetermined data amounts and encodes the data to generate data in accordance with a CD-ROM format.

The encoded data is then transferred to the CD encoder 21. The CD encoder 21 encodes the transferred data to generate data (EFM signals) in accordance with a compact disc digital audio (CD-DA) formal.

The EFM signals are provided in single bit data units to the laser drive circuit 40. In accordance with each EFM signals, the laser drive circuit 40 generates high output and low output drive currents to form recording pits and lands in the optical disc 1. The light reflected from the optical disc 1 is retrieved as a sample signal to perform feedback control and optimize the laser pulse intensity (i.e., the peak value of the laser pulses).

Based on the drive current generated by the laser drive circuit 40, the optical head 50 irradiates a laser pulse, the intensity of which corresponds to the recording intensity, on the optical disc 1 and thus records the data.

The servo system of the data recording device 100 will now be described.

The servo system includes an optical head 50 for irradiating laser pulse on the optical disc 1 and receiving reflected laser pulse, an RF amp 51 for generating binary digital data after amplifying the reflection light received by the optical head 50, and a head servo 52 for controlling the optical head 50 based on the digital data of the RF amp 51.

The optical head 50 includes one recording laser source for selectively irradiating the middle (i.e., a recording layer) of a pregroove, which is formed in the optical disc 1, with a high output laser pulse and a low output laser pulse in accordance with the recording data. Further, the optical head 50 includes two reproduction laser sources, which are used exclusively to reproduce data, for irradiating a low output laser pulse on the two ends of the pregroove. When data is being recorded, the recording laser source, which switches its output, generates a laser pulse based on a drive current generated by the laser drive circuit 40 and irradiates the laser pulse on the optical disc 1.

Figure 2:
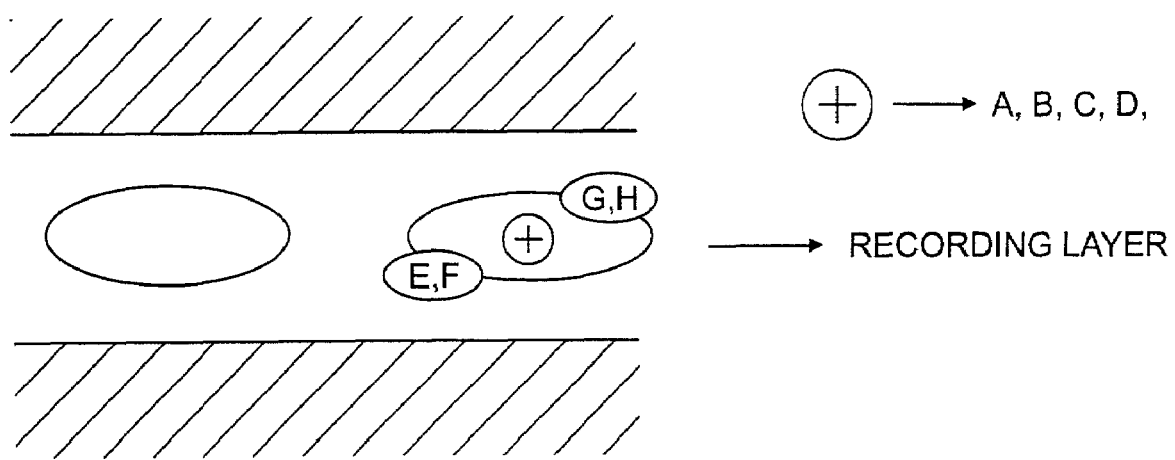
FIG. 2 is an explanatory diagram schematically showing a state in which an optical head of the data recording device shown in FIG. 1 receives a laser pulse.

As shown in FIG. 2, the optical head 50 includes eight light receiving devices (A, B, C, D, F, F, G, H) for receiving the reflection light of a laser pulse from the optical disc 1. Of these eight light receiving devices, light receiving devices A to D receive the reflection light of the laser pulse that is irradiated on the middle of the pregroove from the recording laser source. The light receiving devices E, C and F, H receive the reflection light of the laser pulse that is irradiated respectively from the two reproduction laser sources. Of the light receiving devices E, G and F, H, for example, the light receiving devices E and F receive the light reflected from both ends of the pregroove. The wobble component of the pregroove is detected from the received reflection light.

The optical head 50 converts reflection light received by the light receiving devices of the optical head 50 to an electric signal. The RF amp 51 then amplifies and binarizes the electric signal to generate digital data (signals). The data of the light that was received by the light receiving devices A, B, C, and D is provided to the laser drive circuit 40 as a sample signal and used to perform feedback control.

The head servo 52 receives digital signals from the RF amp 53 and, based on the digital signals, performs focusing control to focus a laser pulse on the optical disc 1. Further, the head servo 52 performs tracking control to track the laser pulse on the tracks of the optical disc 1 and sled forwarding control to displace the optical head 50 in the radial direction of the optical disc 1.

The servo system further includes a spindle motor 53 for rotating the optical disc 1, and a spindle servo 54 for performing control such that the optical disc 1 is rotated at a constant angular velocity by the spindle motor 53. The rotation control of the optical disc 1 controls the laser pulse irradiation position on the optical disc 1 in the circumferential direction of the disc. The optical head 50 controls the irradiation position in the radial direction.

When the optical disc 1 is controlled at a constant angular velocity, the linear velocity changes depending on the laser pulse irradiation position on the optical disc 1. Therefore, a system clock used in various processes performed to record data is altered in accordance with the irradiation position of the laser pulse on the optical disc 1. Namely, the data recording device 100 reproduces the wobble component from the optical disc 1 and generates a clock that is synchronized with the wobble component. The clock synchronized with the wobble component is used as a system clock CLK.

In order to generate the system clock CLK, the data recording device 100 includes a wobble decoder 60 and a system clock generating circuit 70.

The wobble decoder 60 receives a digital signal that contains the reflection light data from the RF amp 51 and demodulates the digital signals. The demodulation extracts a 22.05 kHz wobble component from the digital signals.

The system clock generating circuit 70 receives the wobble component from the wobble decoder 60 and generates a system clocks based on the wobble component. By using the system clock CLK, data is accurately recorded on the optical disc 1 even if there is a change in the speed of the optical disc 1 at the laser pulse irradiation position.

The wobble decoder 60 includes an ATIP demodulation circuit 61. In the ATIP demodulation circuit 61, absolute time information is generated based on the wobble component. Data is recorded at a predetermined position on the optical disc 1 in accordance with the absolute time information.

When data is recorded using the system clock CLK, the data recording device 100 sets the pulse timing and pulse width of the laser pulse output from the optical head at optimum values in correspondence with the linear velocity. The data recording device 100 also sets an appropriate pulse peak value (i.e., laser pulse intensity). For example, the pulse peak value is set such that the peak value of the pulses irradiated on the peripheral portion of the optical disc 1 is larger than the peak value of the pulses irradiated on the inner portion of the optical disc 1.

More specifically, a write strategy that includes the laser pulse peak value, the pulse timing, and the pulse width is altered in units of minutes in accordance with the absolute time demodulated by the ATIP demodulation circuit 61. Furthermore, the write strategies are set separately in accordance with the type of optical disc 1.

The data recording device 100 includes a strategy memory 31 and a strategy specifying circuit 80 to control the write strategy.

The strategy memory 31 is provided in the buffer RAM 30. When the type of optical disc 1 is specified prior to the start of data recording, write strategy data that corresponds to the optical disc 1 is transferred via the interface 10 from a personal computer (not shown) to the strategy memory 31. The strategy memory 31 stores the laser pulse timing and pulse width from the write strategy in minute units.

Based on the absolute time information read in the ATIP demodulation circuit 61 and the write strategy information stored in the strategy memory 31, the strategy specifying circuit 80 generates control signals for controlling the pulse width and pulse timing of the laser pulse output from the optical head 50 and provides the control signals to the laser drive circuit 40.

The write strategy alteration of the data recording device 100 will now be described in detail.

Figure 3:
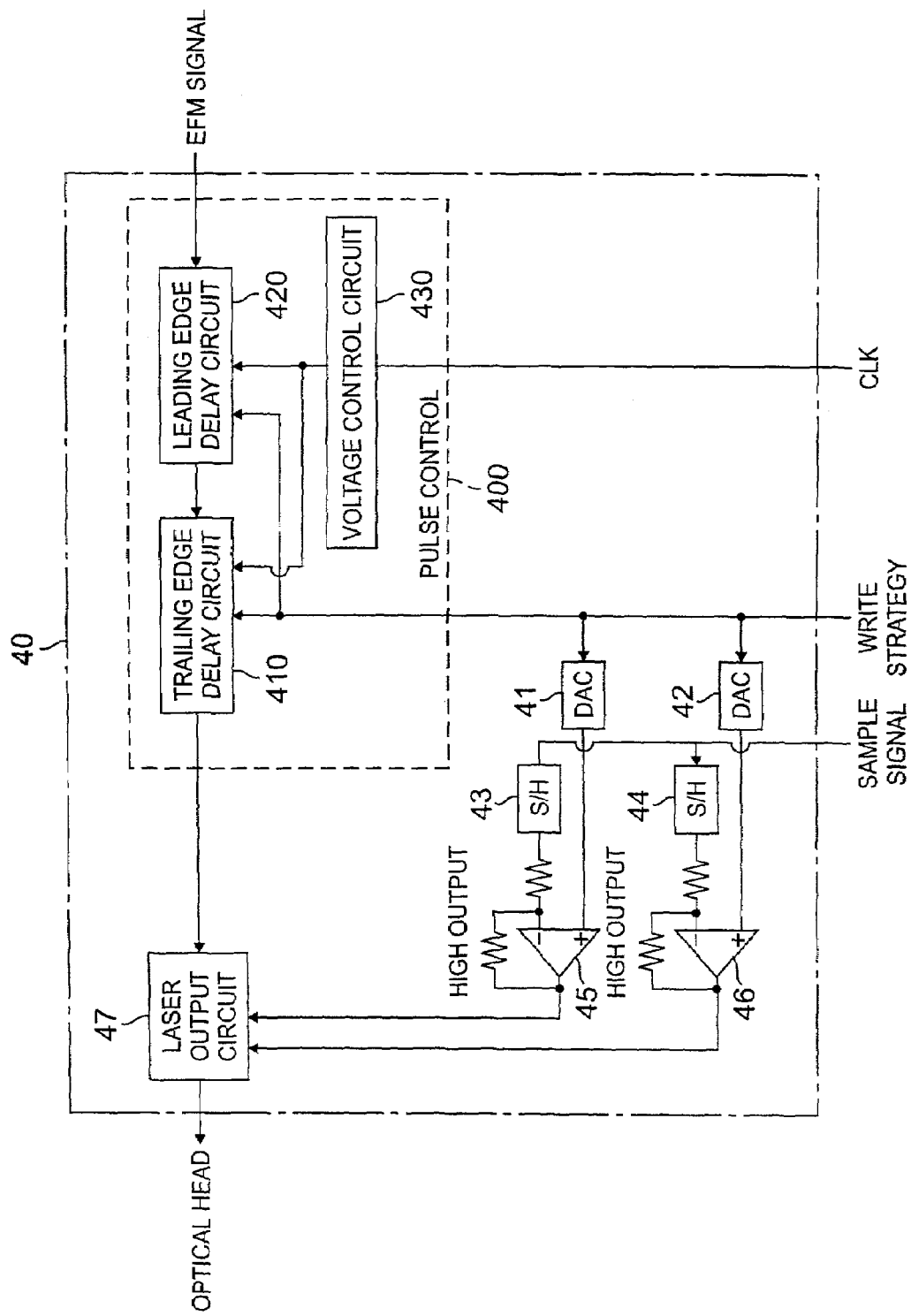
FIG. 3 is a schematic block diagram of a laser drive circuit of the data recording device shown in FIG. 1.

FIG. 3 is a schematic electric block diagram of the laser drive circuit 40. The laser drive circuit 40 includes first and second target value setting circuits (DAC) 41 and 42, first and second sample and holds (S/H) 43 and 44, and a laser output circuit 47.

The recording laser pulse is generated at a high output and a low output. The first DAC 41 sets the high output at an optimum value, and the second DAC 42 sets the low output at an optimum value. The first and second S/Hs 43 and 44 receive a sample signal from the RF amp 51 (sec FIG. 1) in order to perform feedback control the laser pulse intensity (pulse peak value) at the values set by the DACs 41 and 42.

The outputs of the first DAC 41 and the first S/H 43 and the outputs of the second DAC 42 and the second S/H 44 are provided to the laser output circuit 47 via a first comparator 45 and a second comparator 46. In the laser output circuit 47, the intensity of the laser pulse output from the optical head 50 is set by feedback controlling the value input into the first and second DAC 41 and 42. As a result, the laser output is stably controlled at the intensity set by the first and second DACs 41 and 42.

By altering the target value input into the first and second DAC 41 and 42 in minute units, the laser pulse intensity is adjusted to the optimum value that corresponds to the present laser pulse irradiation position. In addition, in a predetermined period after the alteration of the target value in the first and second DACs 41 and 42, as a result of the first and second S/H 43 and 44 performing hold control the sample signals input into the first and second S/H 43 and 44 before the alteration of the target value are input into the first and second comparators 45 and 46. In this case, it is possible to avoid performing feedback control in the period in which the output intensity of the laser output circuit 47 shifts to an intensity that corresponds to the write strategy alteration.

In the preferred embodiment, the target values are changed when a control section (not shown) directly inputs new target values into the first and second DAC 41 and 42. The target values may be detected, for example, based on the absolute time information of the wobble decoder 60 acquired by the control section (not illustrated). Further, in the hold control of the first and second S/Hs 43 and 44 in the predetermined period after the target value alteration, the laser drive circuit 40 is controlled by the strategy read specifying circuit 80 based on information relating to the strategy alteration stored in the strategy memory 31 of FIG. 1.

The laser drive circuit 40 further includes a pulse control circuit 400. The pulse control circuit 400 delays the timing of a leading edge and the timing of a trailing edge in the EFM signal based on the system clock CLK, which is transferred from the encoder 21. As a result, the pulse width and pulse timing of the laser pulse output from the optical head 50 are optimized in accordance with the irradiation position.

The pulse control circuit 400 includes a leading edge delay circuit 420 and a trailing edge delay circuit 410, each of which is a 31 stage delay circuit, and a voltage control circuit 430.

The voltage control circuit 430 receives the system clock CLK and uses a phase locked loop (PLL) to control the delay time of each delay circuit 410, 420 to be 1/32nd of a cycle T of the system clock CLK. In the leading edge delay circuit 420 and the trailing edge delay circuit 410, the number of stages in the delay circuit is set in accordance with the write strategy.

The configuration of the leading edge delay circuit 420 and the voltage control circuit 430 will now be discussed in more detail. Because the structure of the trailing edge delay circuit 410 is basically the same as the structure of the leading edge delay circuit 420, the trailing edge delay circuit 410 will not be described.

Figure 4:
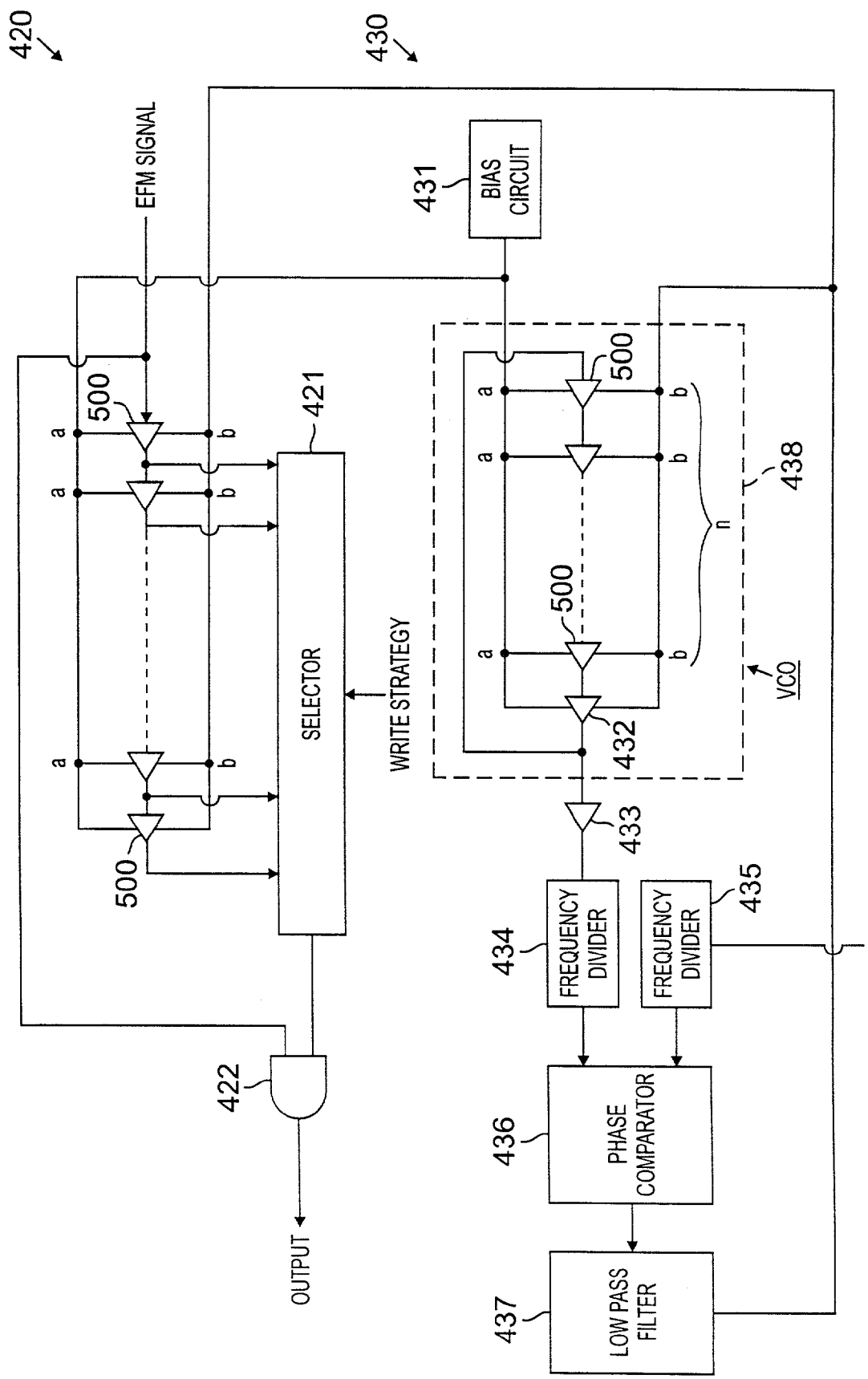
FIG. 4 is a schematic block diagram of a leading edge delay circuit and a voltage control circuit of the laser drive circuit shown in FIG. 3.

FIG. 4 is a schematic block diagram of the leading edge delay circuit 420 and the voltage control circuit 430. The leading edge delay circuit 420 includes a plurality of delay circuits 500 that are connected in series, a selector 421, and an AND circuit 422. In the present embodiment, for example, 31 delay circuits 500 are connected in series.

The selector 421 receives write strategy information and, in accordance with the write strategy information, selects how many (including 0) of the 31 delay circuits 500 to use. At this time, the EFM signal input into the leading edge delay circuit 420 are delayed by a predetermined time that corresponds to the selected number of delay circuits 500.

The AND circuit 422 receives the output of the selector 421 and the EFM signal and calculates the logical product of the output of the selector 421 and the EFM signal. As a result, the leading edge delay circuit 420 delays the leading edge of each pulse of the input EFM signal by a predetermined time.

The delay time of each delay circuit 500 is determined by the voltages applied to its two terminals a and b. Terminal a receives a constant voltage from a bias circuit 431. By controlling the voltage applied to terminal b with the voltage control circuit 430, the delay time is set, for example, to 1/32nd of the cycle of the system clock CLK.

The voltage control circuit 430 includes a voltage control oscillator (VCO) 439. The VCO 438 also includes one or more (the number of which is indicated as n in the drawing) of the delay circuits 500. An inverter 432 inverts the output of the final delay circuit 500. The VCO 438 then performs negative feedback to return the inverted output to the first delay circuit 500. The terminal a of each delay circuit 500 receives a constant voltage from the bias circuit 431.

The output of the VCO 438 (i.e., VCO signals) and the system clock CLK are respectively divided by frequency dividers 434 and 435 and then provided to a phase comparator 436. The phase comparator 436 generates a phase comparison signal in accordance with the phase of the VCO signal and system clock CLK.

The phase comparison signal is provided to terminal b of each delay circuit 500 in the VCO 438 via a low pass filter 437. Accordingly, the delay amount of each delay circuit 500 of the VCO 438 is adjusted by the voltage applied to terminal b. As a result, by appropriately setting the number of delay circuits 500 in the VCO 438 and the division ratios of the frequency dividers 434 and 435, the delay amount of each delay circuit 500 in the leading edge delay circuit 420 is set to 1/32nd of the system clock CLK.

When the delay amount of the delay circuits 500 is represented by dt and the cycle of the VCO 438 is represented by T, the relationship of formula c1 is satisfied.

$$T/2 = dt \times n \quad (c1)$$

When the frequency of the system clock CLK is represented by f0, and the division ratios of the frequency dividers 434 and 435 are respectively represented by x and y, the relation of formula c2 is satisfied.

$$f0/y = (1/T) \times (1/x) \quad (c2)$$

Formula c3 derives from formulas c1 and c2.

$$dt = y/(2 \times n \times f0) \quad (c3)$$

The values x, y, and n are set such that dt satisfies f0×1/32.

Figure 5:
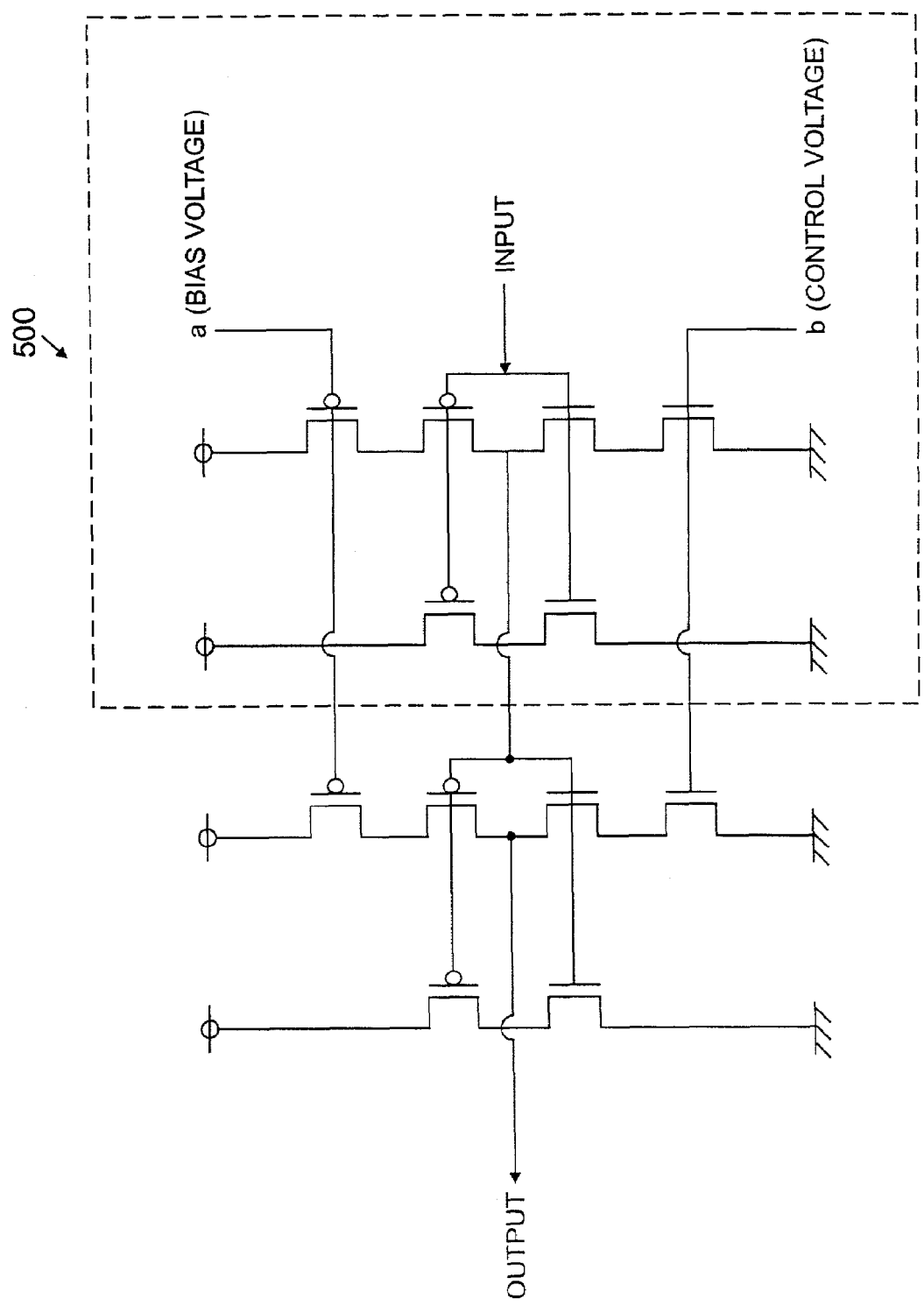
FIG. 5 is a circuit diagram of a delay circuit used in the leading edge delay circuit arid voltage control circuit shown in FIG. 4.

FIG. 5 is a circuit diagram showing an example of the delay circuit 500. The delay circuit 500 has an inverter, which is shown in the box formed by a broken line in FIG. 5. The configuration of the inverter in the delay circuit 500 is the same as that of the inverter 432.

The trailing edge delay circuit 410 differs from the leading edge delay circuit 420 in that the circuit 410 receives the output of the leading edge delay circuit 420 instead of the EPM signal and in that the circuit 410 employs an OR circuit instead of the AND circuit 422.

In the preferred embodiment, the data recording control device includes the CD-ROM encoder 20, the CD encoder 21, the laser drive circuit 40, the head servo 52, the spindle servo 54, the wobble decoder 60, the strategy specifying circuit 80, and the system clock generating circuit 70. Further, the data recording device is formed in an integrated circuit (IC) of a single chip. A laser condition varying unit includes the strategy memory 31, the laser drive circuit 40, the RF amp 51, the wobble decoder 60, the system clock generating circuit 70, and the strategy specifying circuit 80.

The data recording device of the preferred embodiment has the following advantages.

(1) The intensity of the data recording laser pulse is set in accordance with the speed of the optical disc 1 at the laser pulse irradiation position. Therefore, data is recorded properly even when the optical disc 1 is controlled at a constant angular velocity.

(2) The pulse width and pulse timing of the data recording laser are set in accordance with the speed of the optical disc 1 at the laser pulse irradiation position. Therefore, data is recorded properly even when the optical disc 1 is controlled at a constant angular velocity.

(3) The laser drive circuit 40 includes a pulse control circuit 400 that uses a PLL. Therefore, an accurate timing clock is generated from the system clock CLK, which changes in accordance with the laser pulse irradiation position.

(4) The laser drive circuit 40 prohibits feedback control of the laser pulse intensity immediately after the write strategy is altered. Therefore, the transition period required for the write strategy alteration does not affect feedback control.

(5) A write strategy is set for each type of optical disc specified prior to the recording operation. Therefore, data recording is performed further accurately.

(6) The strategy memory 31 acquires and stores write strategies from an external device each time the type of optical disc 1 is specified. Therefore, the data recording device 100 does not require increased memory.

(7) The data recording device 100 makes an alteration to the write strategy every minute with respect to the absolute time of the optical disc 1. This facilitates the alteration of the write strategy.

It should be apparent to those skilled in the art that the present invention may be embodied in many other specific forms without departing from the spirit or scope of the invention. Particularly, it should be understood that the invention maybe embodied in the following forms.

The time interval for altering the write strategy may be changed as required. When altering the write strategy, the time intervals may be set differently depending on the type of optical disc. In addition, the time intervals for altering the write strategy may be changed gradually depending on the laser pulse irradiation position on the optical disc.

The write strategy may be altered, for example, in accordance with the reproduced wobble component, the rotation speed of the optical disc 1 at the laser pulse irradiation position, or an arbitrary equivalent value of the rotation speed.

The buffer RAM may acquire all of the information relating to the write strategy so that the strategy specifying circuit 80 controls the laser drive circuit 40 based on the acquired information.

All of the write strategy information may be managed by the data recording device.

The data recording device may also be provided with an exclusive memory for storing write strategies.

The data recording control device may also be formed in a manner dispersed on a plurality of semiconductor chips. The data recording control device may also be provided with a buffer RAM or exclusive memory for storing write strategies.

Write strategy information corresponding to each individual type of optical disc does not have to be prepared. For example, just one type of write strategy information that is altered in accordance with the speed of the optical disc at the irradiation position may be prepared and, when the trial writing is performed prior to the start of recording, a correction value that corresponds to the relevant optical disc may be calculated.

The write strategy may be altered when determined that the alteration is more effective than performing correction based on the feedback of a laser pulse reflection light.

The write strategy may be altered by altering at least one of the laser pulse intensity, the laser pulse width, and the laser pulse timing.

The data recording device of the present invention may be employed in a device that records data on any type of optical disc.

Therefore, the present examples and embodiments are to be considered as illustrative and not restrictive and the invention is not to be limited to the details given herein, but may be modified within the scope and equivalence of the appended claims.

What is claimed is:

1. A data recording device for recording data on an optical disc by irradiating a laser pulse on the optical disc while controlling rotation of the optical disc at a constant angular velocity, wherein absolute time information is recorded on the optical disk, and the optical disk has a wobble component, the device comprising:
   a clock generating circuit for generating a clock using the wobble component of the optical disc at a position at which the laser pulse is irradiated;
   a detection circuit for detecting the absolute time information recorded on the optical disk; and
   a laser condition varying unit that changes a peak value of the laser pulse in accordance with the absolute time information of the optical disc at a position at which the laser pulse is irradiated.

2. The data recording device according to claim 1, further comprising:
   a feedback unit for receiving reflection light of the laser pulse irradiated on the optical disc and feedback controlling the peak value of the laser pulse;
   wherein the laser condition varying unit prohibits the feedback controlling of the feedback unit for a predetermined period after the peak value of the laser pulse has been altered.

3. The data recording device according to claim 1, wherein the laser condition varying unit changes a method for altering the peak value of the laser pulse in accordance with the type of optical disc.

4. The data recording device according to claim 3, wherein the laser condition varying unit receives a write strategy specifying value that contains information for altering the peak value of the laser pulse from an external device.

5. The data recording device according to claim 4, wherein the laser condition varying unit calculates a predetermined time using the absolute time information, and alters the peak value of the laser pulse using the write strategy specifying value every calculated predetermine time.

6. A data recording device for recording data on an optical disc by irradiating a laser pulse on the optical disc while controlling rotation of the optical disc at a constant angular velocity, wherein absolute time information is recorded on the optical disk, and the optical disk has a wobble component, the device comprising:
   a clock generating circuit for generating a clock using the wobble component the optical disc at a position at which the laser pulse is irradiated;

a detection circuit for detecting the absolute time information recorded on the optical disk; and a laser condition varying unit for altering at least one of a pulse timing and a pulse width of the laser pulse based on the absolute time information.

7. The data recording device according to claim 6, wherein the laser condition varying unit changes a method for altering at least one of a pulse timing and a pulse width of the laser pulse in accordance with the type of optical disc.

8. The data recording device according to claim 7, wherein the laser condition varying unit receives a write strategy specifying value that contains information used for altering at least one of the pulse timing and the pulse width of the laser pulse from an external device.

9. The data recording device according to claim 8, wherein the laser condition varying unit calculates a predetermined time using the absolute time information, and alters a peak value of the laser pulse using the write strategy specifying value every calculated predetermined time.

10. A data recording device for recording data on an optical disc by irradiating a laser pulse on the optical disc while controlling rotation of the optical disc at a constant angular velocity, wherein absolute time information is recorded on the optical disk, and the optical disk has a wobble component, the device comprising:

a clock generating circuit for generating a clock using the wobble component the optical disc at a position at which the laser pulse is irradiated;

a detection circuit for detecting the absolute time information recorded on the optical disk; and a laser condition varying unit for altering a peak value of the laser pulse in accordance with the absolute time information of the optical disc at a position at which the laser pulse is irradiated;

wherein the laser condition varying unit alters at least one of a pulse timing and a pulse width of the laser pulse based on the absolute time information.

11. A data recording device for recording data on an optical disc by irradiating a laser pulse on the optical disc while controlling rotation of the optical disc at a constant angular velocity, wherein absolute time information is recorded on the optical disk, and the optical disk has a wobble component, the device comprising:

a clock generating circuit for generating a clock using the wobble component of the optical disc at a position at which the laser pulse is irradiated;

a detection circuit for detecting the absolute time information recorded on the optical disk;

a storage device for storing a specifying value specifying at least one of a pulse timing and a pulse width of the laser pulse, wherein the specifying value is set in accordance with the absolute time information of the optical disc at a position at which the laser pulse is irradiated; and a control unit for reading the specifying value stored in the storage device and altering at least one of the pulse timing and the pulse width of the laser pulse based on the read specifying value.

12. A data recording control device for controlling recording of data on an optical disc while controlling rotation of the optical disc at a constant angular velocity, wherein the date is recorded by irradiating a laser pulse on the optical disc, and wherein a spiral pregroove for recording disc information including absolute time information is formed on the optical disc, and the optical disc has a wobble component, the device comprising:

a detection circuit for reproducing the disc information of the pregroove and detecting the absolute time information of the optical disc at a position at which the laser pulse is irradiated in accordance with the reproduced disc information;

a clock generating circuit for generating a clock using the wobble component of the optical disc;

a strategy specifying circuit connected to the detection circuit for specifying a peak value of the laser pulse in accordance with the absolute time information; and a laser drive circuit connected to the strategy specifying circuit for altering the peak value of the laser pulse to the specified peak value, based on the absolute time information.

13. The data recording control device according to claim 12, wherein the laser drive circuit includes:

a target value setting circuit for setting a target peak value used to alter the peak value of the laser pulse;

a sample signal acquisition circuit for receiving a sample signal of a reflection light of the laser pulse from the optical disc;

a control circuit for controlling the peak value of the laser pulse by comparing the target peak value with a value relating to the sample signal of the sample signal acquisition circuit; and wherein the sample signal acquisition circuit holds a value of the sample signal received before the peak value of the laser pulse is altered for a predetermined time after the peak value of the laser pulse is altered.

14. The data recording control device according to claim 12, wherein the strategy specifying circuit changes a method for altering the peak value of the laser pulse in accordance with the type of optical disc.

15. The data recording control device according to claim 14, further comprising:

a memory connected to the strategy specifying circuit for retrieving and holding information from an external device that relates to a method for altering the peak value of the laser pulse that is specified for each type of optical disc;

wherein the strategy specifying circuit alters the peak value of the laser pulse in accordance with the absolute time information and the information held in the memory.

16. The data recording control device according to claim 15, wherein the strategy specifying circuit calculates a predetermined time using the absolute time information and alters a peak value of the laser pulse every calculated predetermined time.

17. A data recording control device for controlling recording of data on an optical disc while controlling rotation of the optical disc at a constant angular velocity, wherein the date is recorded by irradiating a laser pulse on the optical disc, and wherein a spiral pregroove for recording disc information including absolute time information is formed on the optical disc, and the optical disc has a wobble component, the device comprising:

a detection circuit for reproducing the disc information of the pregroove and detecting a the absolute time information of the optical disc at a position at which the laser pulse is irradiated in accordance with the reproduced disc information;

a clock generating circuit connected to the detection circuit for generating a clock using a wobble component of the optical disc at the position at which the laser pulse is irradiated;

a strategy specifying circuit connected to the detection circuit for specifying at least one of a pulse width and a pulse timing of the laser pulse in accordance with the absolute time information; and a laser drive circuit connected to the strategy specifying circuit for altering the at least one of the pulse width and the pulse timing of the laser pulse to the specified at least one of the pulse timing and the pulse width of the laser pulse based on the absolute time information.

18. The data recording control device according to claim 17, wherein the strategy specifying circuit changes a method for altering a peak value of the laser pulse in accordance with the type of optical disc.

19. The data recording control device according to claim 18, further comprising:

a memory connected to the strategy specifying circuit for retrieving and holding information from an external device that relates to a method for altering at least one of the pulse width and the pulse timing that is specified for each type of optical disc;

wherein the strategy specifying circuit alters the at least one of the pulse width and the pulse timing of the laser pulse in accordance with the absolute time information of the detection circuit and the information held in the memory.

20. The data recording control device according to claim 19, wherein the strategy specifying circuit calculates a predetermined time using the absolute time information and alters at least one of the pulse width and the pulse timing of the laser pulse every calculated predetermined time.

21. A data recording control device for controlling recording of data on an optical disc while controlling rotation of the optical disc at a constant angular velocity, wherein the date is recorded by irradiating a laser pulse on the optical disc, and wherein a spiral pregroove for recording disc information including absolute time information is formed on the optical disc, and the optical disc has a wobble component, the device comprising:

a detection circuit for reproducing the disc information of the pregroove and detecting the absolute time information of the optical disc at a position at which the laser pulse is irradiated in accordance with the reproduced disc information;

a clock generating circuit connected to the detection circuit for generating a clock using the wobble component of the optical disc at the position at which the laser pulse is irradiated in accordance with the absolute time information;

a strategy specifying circuit connected to the detection circuit for specifying a peak value of the laser pulse and at least one of a pulse width and a pulse timing of the laser pulse in accordance with the absolute time information; and a laser drive circuit connected to the strategy specifying circuit for altering the peak value of the laser pulse based on the specified peak value, wherein the laser drive circuit alters the at least one of the pulse width and the pulse timing of the laser pulse to the specified at least one of the pulse timing and the pulse width of the laser pulse based on the absolute time information.

* * * * *